UNITED STATES PATENT OFFICE.

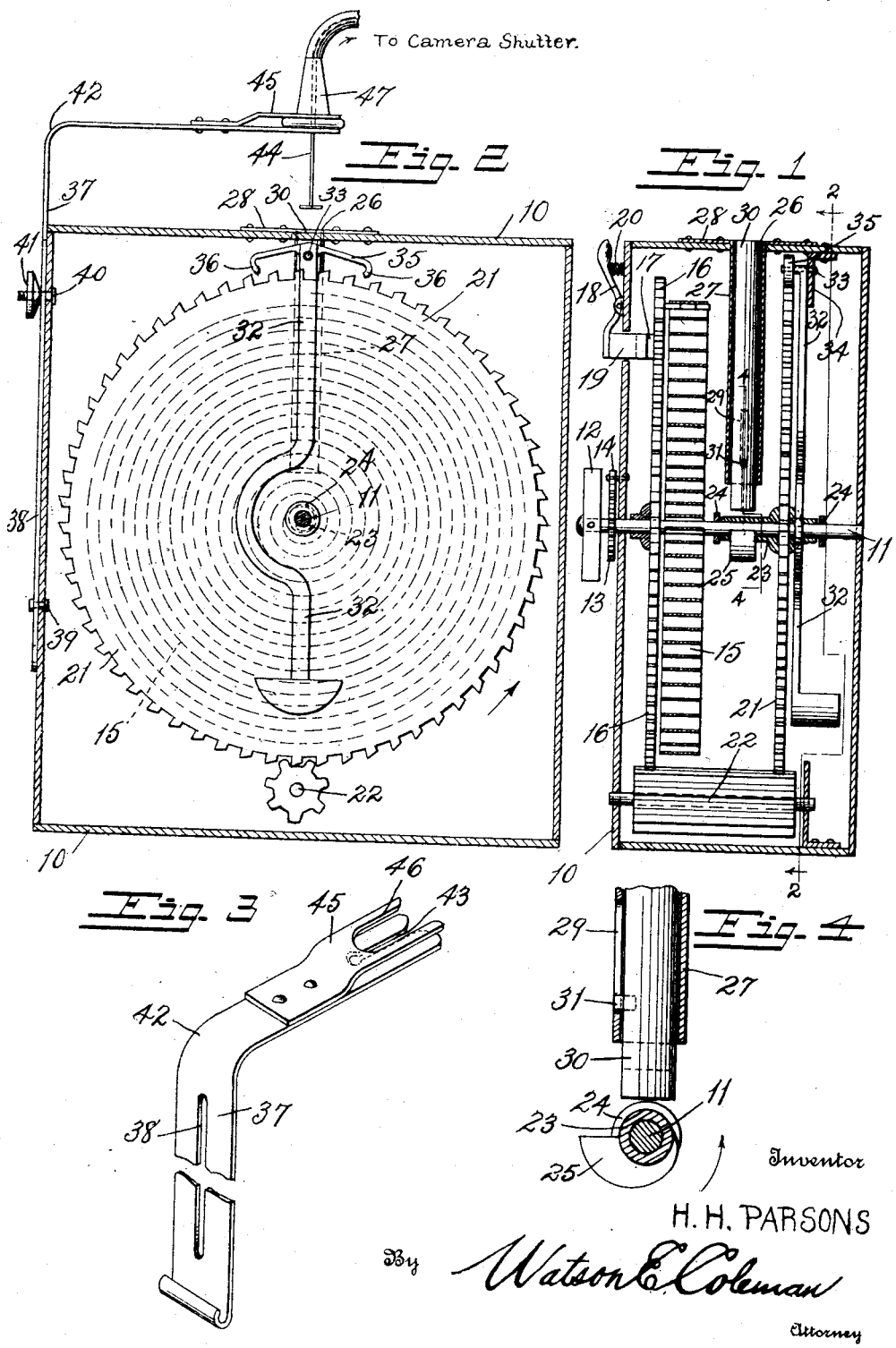

HOUSTON H. PARSONS, OF SIDNEY, MONTANA.

TIME-RELEASE FOR PHOTOGRAPHIC CAMERAS.

1,217,493.  Specification of Letters Patent.  Patented Feb. 27, 1917.

Application filed February 2, 1916. Serial No. 75,792.

*To all whom it may concern:*

Be it known that I, HOUSTON H. PARSONS, a citizen of the United States, residing at Sidney, in the county of Richland and State of Montana, have invented certain new and useful Improvements in Time-Releases for Photographic Cameras, of which the following is a specification, reference being had to the accompanying drawings.

This invention relates to photographic appliances, and particularly devices for automatically operating the shutter of a camera at a predetermined time.

The general object of the invention is the provision of a camera attachment so constructed as to actuate the shutter trip of a camera after the lapse of a predetermined period of time so that it is possible for the operator, after the device is set going, to take his stand in front of the camera, the device throwing the shutter at a given period, say ten seconds after it has been started. Heretofore it has been necessary, in order for a camera operator to take a picture of himself, that a string be attached to the camera trip or a long tube and bulb be used. This is open to many objections, and particularly is open to the objection that it is difficult to apply a string to the "cable release" shutter trips ordinarily employed on many forms of cameras.

Another object of the invention is the provision of a device of this kind which is contained within a relatively small case, which is adapted to be engaged with the "cable release" of a photographic camera and be disposed in any convenient position and not be attached to or formed as part of the camera itself.

A further object of the invention is the provision of a device of this character which is very simple as regards its internal mechanism, which is positive in its action, and which may be made very compact.

A further object of the invention is the provision of an attachment of this character in which the holder for the "cable release" is adjustable, thus to adapt the device to cable releases which are not uniform in action.

Other objects will appear in the course of the following description.

My invention is illustrated in the accompanying drawings, wherein:

Figure 1 is a longitudinal vertical section of a shutter releasing attachment for cameras constructed in accordance with my invention;

Fig. 2 is a section on the line 2—2 of Fig. 1;

Fig. 3 is a perspective view of the means for holding the cable release of the camera;

Fig. 4 is a detail sectional view of the cam, the plunger, and the plunger guide.

Referring to these drawings, 10 designates a case of sheet metal or any other suitable material. Passing transversely through the case is a shaft 11 which carries a winding key 12 upon one end and also carries a ratchet wheel 13 engaged by a pawl 14 mounted upon the face of the case. Surrounding this shaft 11 is a spring 15, and loosely and rotatably mounted upon the forward end of the shaft is a gear wheel 16 which is operatively connected to the spring so that when the spring is wound up and the wheel is released by a means to be later stated, the spring will cause the gear wheel 16 to revolve. In order to hold the wheel from revolving, I have provided a stop 17 upon the wheel and provide upon the face of the case the latch 18 having the form of a bell crank lever, one end of the latch being provided with a stop 19 which normally is in the path of movement of the stop 17. The spring 20 engages the latch so as to force the stop 19 into the path of movement of the stop 17.

Also loosely mounted upon the shaft 11 to rotate therearound is a gear wheel 21 which may have the same diameter as the wheel 16, and motion is communicated from the wheel 16 to the gear wheel 21 by means of the toothed shaft 22 or by any other suitable transmission mechanism. This toothed shaft 22 practically forms an elongated gear wheel which is rotatably mounted in any suitable manner within the case. The gear wheel 21 has an elongated hub 23 which is held in proper longitudinal position upon the shaft 11 by means of the collars 24. Formed upon this hub 23 is a cam 25.

The end wall of the case 10 is formed with an opening 26, and within this opening is inserted a tubular guide 27, this guide at its outer end being flanged, as at 28, and riveted, bolted or otherwise attached to the end wall of the case. The guide at its inner end is slotted as at 29 and longitudinally shiftable through this guide is a plunger 30 which is formed with a laterally projecting pin 31 engaging the slot 29. This plunger 30 projects into the path of movement of the cam 25, the curved face of the cam engaging with the end of the plunger. The rotation of the wheel 21 is regulated by any escapement mechanism, and for this purpose a pendulum 32 is shown, pivoted at 33 upon a pin projecting from a suitable bracket 34 attached to the case, the lower end of the pendulum being provided with a weight while the upper end is provided with a pallet 35 having inwardly turned teeth 36 engaging with the teeth on the gear wheel 21. It will be obvious that the motion of the wheel 21 will give an oscillation to the pendulum and that this will allow the escapement teeth 36 to engage alternately with the teeth on the wheel 21, permitting a relatively slow step by step rotary movement of the wheel 21, and that when the wheel 21 is turned to a predetermined degree the cam 25 will engage with the plunger 30 and cause the projection of the plunger out of the casing.

Mounted upon the face of the casing or mounted in any other suitable manner is a clip for engaging the head of the shutter release. This comprises a shank 37 which is longitudinally slotted at 38 and fits against the face of the case 10. A guide pin 39 extends out from the case and enters the slot, and a screw threaded guide pin 40 also extends out from the case and passes through the slot and is engaged by a nut 41. By this means the shank 37 may be adjusted longitudinally upon the case 10. This shank 37 is formed of a thin strip of metal which is angularly bent as at 42 and the extremity of which is slotted as at 43, the end of the strip on each side of the slot being rounded. The slot 43 is just large enough to receive the plunger 44 of the ordinary cable release. Attached to the outer face of the angular end 42 is a strip 45 which is cut out as at 46 to fit against the head 47 of the cable release and around the tapering shank portion thereof, as illustrated most clearly in Fig. 2. When the head of the cable release is disposed within the gap formed by the members 42 and 45, the plunger 44 of the cable release will extend out through the enlarged end of the slot 43 and be disposed immediately opposite to and in alinement with the end of the trip plunger 30.

With the parts set as above described and the camera ready for taking a picture, the latch 18 is depressed, lifting the stop 19 from the stop 17 whereupon the spring 15 will start the rotation of the wheel 16. The latch is then released and the operator who has released the latch moves into the view of the camera. The spring 15 now operates to rotate the wheel 16 and this, through the gear wheel 22, rotates the wheel 21, the escapement causing a relatively slow and regular rotation of this wheel 21. As the wheel 21 rotates, the cam 25 will gradually be brought into engagement with the inner end of the plunger 30, the plunger 30 will be shifted outward and when it strikes the head of the plunger 44 of the cable release the release will be operated and the shutter will be snapped.

The spring 15 may have sufficient strength so that one winding will do for a plurality of releases, but the spring may be readily wound at any time by rotating the winding key 12, the spring being held under tension by the pawl 14.

Attention is directed to certain minor but important features of the mechanism which I have provided. One of these features is that after one actuation of the plunger 30 the device automatically resets itself ready for a second actuation. The number of times which the plunger may be reciprocated without rewinding the spring 15 depends of course, upon the strength of the spring 15, thus the spring does not have to be rewound after each operation, nor does any portion of the mechanism have to be reset. Again, the plunger 30 is forced outward by the cam 25. This cam gives a gradual but positive movement to the plunger and after it is given this movement passes onward to the position shown in Fig. 4 so that the plunger may be thrust back into its normal position by the spring ordinarily contained within the cable release and which acts upon the member 44. As before remarked the movement of the plunger 30 under the influence of the cam 25 is gradual. There is no sudden shock given to the plunger which would tend to jar the camera. Furthermore, it will be seen that because of the use of clockwork or a train of gears the motion of the parts is positive, certain and its timing is definite and fixed. The lapse of time between the release of the wheel 21 and the projection of the plunger can be known with exactitude. From the figures it will be seen that the plunger is not actuated immediately upon the release of the gear wheel 16 but that an appreciable time elapses before the cam 25 moves to a position where it begins to raise the plunger, thus giving ample time for the operator to move into position before there is any chance of the release being operated.

While I have illustrated certain details of construction and a certain arrangement of parts, it will be obvious that the mechanism may be modified in many ways without in any way departing from the spirit of the invention and that the motion of the spring may be communicated to the cam or an equivalent mechanical device by many different kinds of intermediate mechanism.

The device is extremely simple, may be very cheaply made, and may be very compact in form. It is of particular advantage because it does not have to be attached to the camera itself, though it may be so attached, and because it is peculiarly adapted to actuating the cable release. While I have illustrated the device on a relatively large scale it is to be understood that it may be made very compact by the use of intermediate gearing between the spring wheel 16 and the cam shaft 23.

Having described the invention, what I claim is:

1. In a device of the character described, a casing having an opening, a plunger slidably mounted in the casing and adapted to be projected through said opening, a shaft extending through the casing, a spring operatively connected at one end to the shaft, a gear wheel to which the other end of the spring is connected, means for winding up the spring and holding it from unwinding, a latch mounted upon the exterior of the casing and having a stop normally engaged with the gear wheel to prevent the rotation thereof under the action of the spring, a cam operatively supported beneath the plunger and engageable with said plunger upon a rotation of the cam, means for transmitting the motion of the gear wheel to said cam, means for controlling the rate of rotation of the shaft, and means mounted upon the exterior of the casing for holding a camera tripping member in alinement with the plunger.

2. In a releasing device of the character described, a plunger, a rotatable cam having its highest portion initially out of engagement with the plunger but positively engaging with the plunger to shift it outward at one part of its rotation, time controlled means for rotating the cam, and manually operable means for starting the time controlled means and automatically stopping the time controlled means after the cam has made a complete rotation and the plunger has been fully projected by the cam and the highest portion of the cam has passed the plunger.

3. In a releasing device for photographic cameras, a casing, a shaft passing through the casing and having a key at one end, a gear wheel loosely mounted upon the shaft, a spring operatively connected to the gear wheel and to the shaft, means for winding up said spring, means normally preventing rotation of the gear wheel but manually actuatable to permit said rotation, a plunger mounted in the casing and projectable therefrom, a cam adapted to engage with and positively operate the plunger, a gear wheel mounted in connection with the cam, means for transmitting the motion of the first-named gear wheel to the second-named gear wheel, and means for governing the rate of rotation of the second-named gear wheel.

4. In a shutter releasing device for cameras, a movable release operating member, a rotatable actuating means therefor initially out of operative engagement therewith but movable into such operative engagement and past the point of said engagement, a spring actuated gear train operatively connected to the actuating member to rotate it into and past its operative position and into its initial position, manually actuatable means for holding the gear train from actuation and releasing the gear train, said means acting to automatically stop the movement of the gear train after the release operating member has been fully operated and said actuating means has been shifted out of operative engagement with the operating member and to its initial position.

5. In a device of the character described, a casing having an opening in one end, a guide tube disposed in said opening, a plunger slidably mounted in the guide tube, a shaft extending through the casing in alinement with the end of the plunger, a winding key on the exterior end of the shaft, a ratchet wheel on the shaft, a pawl engaging the ratchet wheel, a gear wheel rotatably mounted upon the shaft, a spring operatively connected at one end to the shaft and at the other end to said gear wheel, the gear wheel being provided with a stop, a latch mounted upon the exterior of the casing and having a stop normally engaged with said stop on the gear wheel to prevent the rotation thereof under the action of the spring, a sleeve mounted upon the shaft and independently rotatable thereof, a gear wheel carried by the sleeve, a cam carried by the sleeve and disposed in alinement with the plunger, means for transmitting the motion of the first-named gear wheel to the second-named gear wheel, escapement mechanism for controlling the rate of rotation of the second-named gear wheel, and means mounted upon the exterior of the casing for holding a camera tripping member in alinement with the plunger, said means being longitudinally adjustable toward or from the plunger.

6. In a shutter releasing mechanism for photographic cameras, a release operating member, actuating means therefor movable in a closed path and during one portion of its movement operatively engaging with and shifting said operating member and moving out of operative engagement therewith, a spring operatively connected to and adapted to operate said shifting means a plurality of times for each winding of the spring, means for winding up the spring, and manually operable means normally holding the actuating means from movement but releasing the actuating means to permit said movement and automatically stopping said actuating means after it has moved a predetermined distance and said operating member has been shifted to its initial position.

7. In a shutter releasing mechanism for photographic cameras, a shutter release operating member, actuating means therefor movable in a closed path into or out of engagement with said operating member and when in engagement with the operating member shifting it, a spring operatively connected to and acting to shift said actuating means a plurality of times for one winding of the spring, means for winding up the spring, and manually operable means normally holding the actuating means from movement but releasable to permit said movement and automatically stopping the movement of the actuating means when said actuating means has made a complete rotation and the release operating member has been retracted.

In testimony whereof I hereunto affix my signature in the presence of two witnesses.

HOUSTON H. PARSONS.

Witnesses:
J. S. BEAGLE,
FRED A. FLANDERS.

Copies of this patent may be obtained for five cents each, by addressing the "Commissioner of Patents, Washington, D. C."